July 12, 1927.

V. WISNIEWSKI

ELECTRIC MOTOR

Filed June 3, 1924

1,635,872

Inventor:
Vincent Wisniewski
By
Sturtevant & Mason
Attorneys.

Patented July 12, 1927.

1,635,872

UNITED STATES PATENT OFFICE.

VINCENT WISNIEWSKI, OF BERLIN, GERMANY.

ELECTRIC MOTOR.

Application filed June 3, 1924, Serial No. 717,551, and in Germany June 6, 1923.

This invention has relation to apparatus for imparting reciprocatory, or even rotary, motion to other apparatus or mechanism. The invention is particularly, but not exclusively, applicable to the driving or actuation of a board or carrier bearing advertising matter. It has been proposed to drive or actuate an advertisement carrier by means of a rigid and automatically-controlled pendulum that oscillates rapidly between two electric contacts but with such an arrangement the acceleration of the mass of the pendulum at the end of each oscillation is interfered with owing to contact or rubbing of electric contacts over one another. Moreover the electric circuit is only broken for very short periods of time.

The present invention has relation to apparatus of the kind mentioned, which differs from the known arrangements in that a spring-supported oscillating mass is utilized as the driving means, the characteristic feature of the invention consisting in the fact that the pendulum rod is flexible, for example, comprises one or more leaf springs, and has a pendulum weight at its free end.

With this arrangement the inertia force produced at the end of each oscillation by the mass of the swinging pendulum is preserved, since it is stored by the tension of the spring and is again given out on the return.

Moreover, owing to the longer period of oscillation, only a minimum expenditure of power is required, since it is required only at one or at both ends of the oscillation.

Furthermore, this small power requirement is imparted to the pendulum in accordance with this invention by means of an electro-magnetic device which is arranged at one or both ends of the oscillation in such a way that the swinging mass of the pendulum is pulled beyond its natural amplitude and additional tension is thereby imparted to the pendulum rod.

The invention can be carried into effect in many ways in order to obtain reciprocating, or even rotary, motion.

In order that the invention, the nature and objects of which have been disclosed, may be clearly and readily understood, reference will now be made to the accompanying drawing, on which an embodiment is illustrated diagrammatically:—

Figure 1:
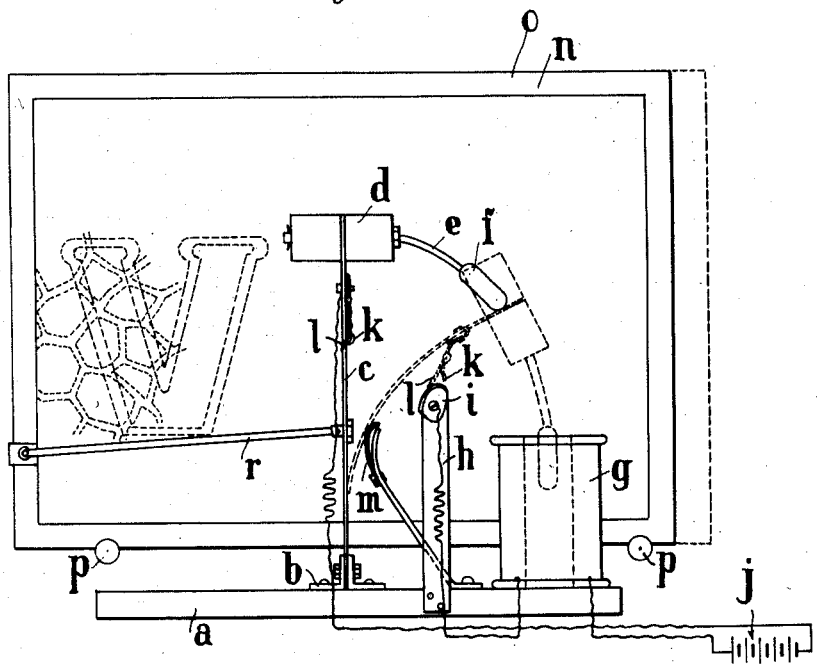
Figure 2:
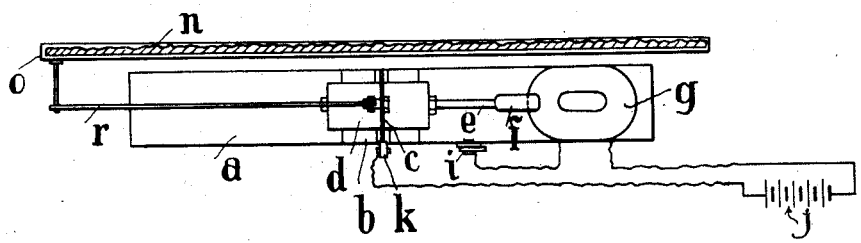

Fig. 1 being an elevational view; and Fig. 2 a plan view.

$c$ is a leaf spring fastened at its lower end in a vertical position to an insulating base $a$ by means of two angle irons $b$. At its upper and free end, the spring $c$ carries a weight $d$, which may, as illustrated, consists of two cylindrical pieces of metal mounted on opposite sides of the spring $c$. The spring $c$ and weight $d$ constitute a pendulum, the period of vibration of which may be varied by adjusting the position of the weight $d$.

$f$ is an iron core attached to the weight $d$ by means of a rod $e$. The rod $e$ is advantageously curved in a downward direction. $g$ is a solenoid excited from a source of current $j$ and adjustably mounted on the base $a$. The solenoid $g$ is positioned so as to be directly below the core $f$ when the pendulum $c$, $d$ is at one end of its oscillation.

The circuit containing the solenoid $g$ is connected at one end to a wiper contact $k$ carried by the pendulum $c$, $d$, and at the other end to a contact $i$ on a standard $h$ adjustably mounted on the base $a$. When the pendulum $c$, $d$ is set in vibration, the circuit described is closed at or towards the one end of the swing of the pendulum by the wiper contact $k$ contacting with the contact $i$. By this means the solenoid $g$ is excited and attracts the core $f$, which at this time is positioned above the upper end of the solenoid. When the core $f$ is subjected to the attraction exerted by the solenoid $g$, the pendulum $c$, $d$ is caused to move beyond the normal amplitude conditioned by the resiliency of its supporting spring $c$, and as a result the wiper contact $k$ is moved away from and beyond the contact $i$ and the circuit is broken. When this happens and the attraction exerted by the solenoid $g$ is removed, the pendulum makes its return oscillation.

The wiper contact $k$ has at its back a layer $l$ of insulating material, which during the return swing of the pendulum passes over the contact $i$ and prevents the closing of the circuit.

$m$ is a second spring mounted on the base $a$ so as to contact with the pendulum $c$, $d$ towards the end of its swing and positioned so that when the weight $d$ is subject to the influence of the solenoid $g$ both the spring $c$ and the spring $m$ are stressed additionally.

In order to impart a reciprocating movement by the means described, for example, to a board *n* carrying advertising matter, the board *n* is mounted in a frame *o* carried on rollers *p* and articulated by a rod *r* attached to the pendulum *c*, *d*.

The operation of the apparatus is as follows:—

The pendulum *c*, *d* is set in vibration by, for example, taking hold of the weight *d* and moving it to the left. When the weight is released, the pendulum swings to the right beyond the vertical and brings the core *f* close to and above the solenoid *g*. At the moment that the wiper contact *k* contacts with the contact *i*, the solenoid is excited and attracts the core *f* which is pulled downward so that the pendulum is moved beyond the normal end of its swing. The springs *e* and *m* are also stressed additionally and the wiper contact *k* is moved away from the contact *i*. The exciting circuit is thus broken, the core is no longer attracted and the pendulum swings back. The action is repeated at each oscillation of the pendulum and when once the operation has been started it continues indefinitely.

What I claim is:—

1. In an electric motor, a frame, an electromagnetic winding on said frame, a pendulum on said frame having a mass of magnetic material to be attracted by said winding when energized, a stationary contact on said frame, a movable contact on said pendulum to conductively engage said stationary contact and become disengaged from the same before said pendulum reaches the end of its oscillation, means to prevent a further conductive engagement between said contacts until the pendulum has returned to the same point of its oscillations, and circuit connections from a source of power to said winding and contacts.

2. In an electric motor, a frame, a flexible pendulum rigidly supported at one end in said frame, a pendulum mass located at the free end of said pendulum, an electromagnetic winding on said frame adapted to attract the free end of the pendulum system when energized, and means to cause a momentary current to pass through and energize said winding only shortly prior to its reaching the end of an oscillation in one direction, said current being interrupted prior to the completion of the oscillation in such direction.

3. In an electric motor, a frame, a flexible pendulum rigidly supported at one end in said frame, a pendulum mass located at the free end of said pendulum, an electromagnetic winding on said frame adapted to attract the free end of the pendulum system when energized, a resilient stop to limit the movement of an intermediate portion of said pendulum in the oscillation toward said winding whereby to place additional stress upon the free end of said pendulum, a mechanical connection from an intermediate point of said pendulum to a device to be moved by said motor, and a circuit closer actuated for closing and immediate opening by movement of the free end of said pendulum shortly prior to its reaching the end of such an oscillation.

4. In an electric motor, a frame, a pendulum supported on said frame, an electromagnetic winding adapted when energized to cause said pendulum to oscillate, a stationary contact on said frame, a wiper contact on said pendulum adapted to conductively engage said stationary contact during movement of said pendulum in one direction, and thereupon leave the same, and an insulating member attached to said wiper contact to be presented between the same and said stationary contact during the return movement of said pendulum.

In testimony whereof I have signed my name to this specification.

VINCENT WISNIEWSKI.